No. 652,097. Patented June 19, 1900.
E. EINFELDT.
METAL WHEEL.
(Application filed Apr. 20, 1900.)
(No Model.)
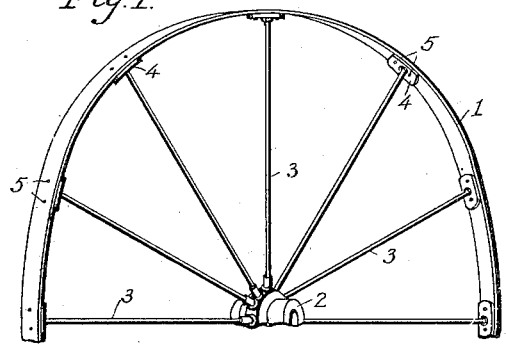
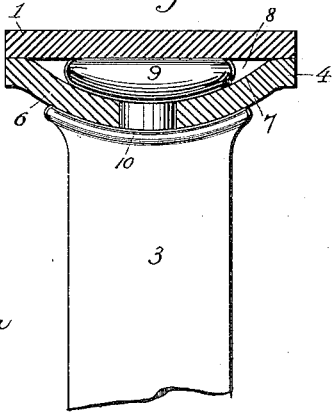
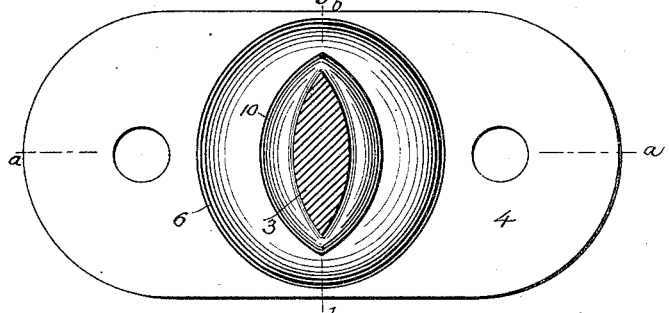
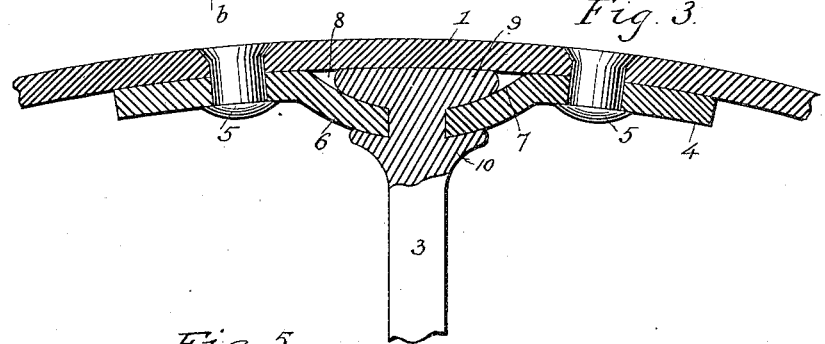
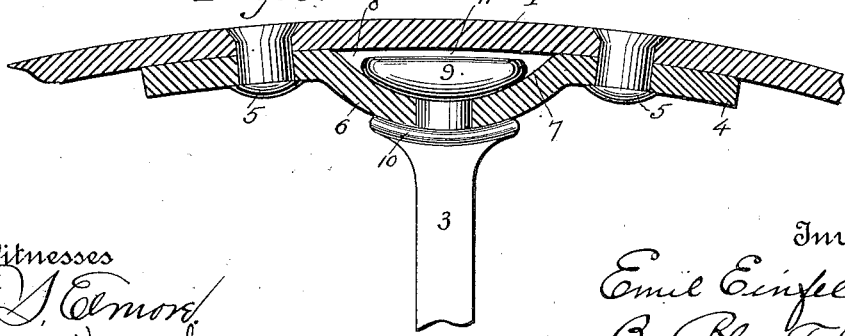
Witnesses
Inventor
Emil Einfeldt
By Phil T. Dodge
Attorney

UNITED STATES PATENT OFFICE.

EMIL EINFELDT, OF DAVENPORT, IOWA, ASSIGNOR TO THE BETTENDORF METAL WHEEL COMPANY, OF IOWA.

METAL WHEEL.

SPECIFICATION forming part of Letters Patent No. 652,097, dated June 19, 1900.

Application filed April 20, 1900. Serial No. 13,644. (No model.)

*To all whom it may concern:*

Be it known that I, EMIL EINFELDT, of Davenport, county of Scott, and State of Iowa, have invented a new and useful Improvement in Metal Wheels, of which the following is a specification.

This invention relates to metal wheels, and is designed to prevent the crystallization and fracture of the outer end of the spoke, which frequently occurs in wheels where the spoke is riveted directly to the rim.

The invention consists in connecting the outer end of the spoke with the rim by means of a socket-plate attached to the inner face of the rim and fastened to the spoke by means of a head or shoulder on the end of the spoke, the plate being formed with relation to the rim to leave a space between them to give room for the head.

The invention consists also in so forming this socket-plate that when connected with the rim and spoke the end of the spoke will be free of contact with the rim, to the end that the plate will be permitted to act with a cushioning effect.

The invention consists also in the details of construction and combination of parts hereinafter described and claimed.

Referring to the drawings, Figure 1 is a perspective view of a portion of a wheel embodying my invention. Fig. 2 is a sectional elevation of one of the socket-plates as viewed from the inner side, showing the spoke in cross-section. Fig. 3 is a longitudinal sectional elevation of the same on the line $a\ a$. Fig. 4 is a transverse sectional elevation on the line $b\ b$ of Fig. 2. Fig. 5 is a section of a modification.

In the accompanying drawings, 1 represents a metallic rim, 2 a hub, and 3 a series of spokes connected at their inner ends with the hub and at their outer ends with the rim through the medium of socket-plates 4, riveted, as at 5, to the inner face of the rim. The socket-plates are preferably of steel to give them a certain degree of elasticity, and each is formed at its center with an inwardly-curved bulging portion 6, forming on the opposite side of the plate a corresponding recess or concavity 7. Beyond the concavity the plate is flat at its ends and sides, so as to rest flatly against the inner surface of the rim, in which position of the parts a space or chamber 8 is left between the rim and plate formed by the concavity. The spoke is extended at its outer end through a hole in the bulging portion in the plate and has formed on its end a head 9, situated in the space 8. At the outer side of the plate the spoke has formed on it a shoulder 10, which, in connection with the head, forms an effectual and rigid junction of the spoke with the plate.

In Figs. 3 and 4 the head on the end of the spoke abuts against the inner face of the rim; but its rigid and firm connection with the plate prevents the full force of the vibrations from being transmitted to the spoke, the socket-plate acting to a certain extent with a cushioning effect. While this construction has been found to act satisfactorily to relieve the spokes of the injurious effects due to the constant jarring to which the wheels are in practice subjected, the cushioning effect of the plates may be increased by forming and arranging the parts as shown in Fig. 5, where the head of the spoke is maintained out of contact with the rim, with a space 11 between them. This may be accomplished by forming the concavity in the plate deeper or by reducing the size of the head. In this construction, while the elasticity of the plate is greater than in the other case and while the cushioning effect is correspondingly greater, there is practically no end motion of the spoke relative to the rim. The plate, being the medium of the connection between the spoke and rim, effectually dissipates the injurious effects of the constant vibrations and jarring of the rim.

The head on the end of the spoke is formed, preferably, by inserting the end of a previously-shouldered spoke through the opening in the plate and upsetting the projecting end, a practice now commonly resorted to in the manufacture of wheels in fastening the spokes directly to the rim. Such a connection forms a joint of remarkable rigidity and firmness, constituting practically an integral connection of the spoke with the plate, so that the latter effectually takes up the vibrations of the rim and prevents them from being transmitted directly to the spoke.

Having thus described my invention, what I claim is—

1. In a metal wheel the combination with the rim, of a socket-plate fixed to the inner face of the rim and formed to leave a space between them, a spoke having its end extending through the plate and firmly connected thereto, and a head on the end of the spoke situated in said space.

2. In a metal wheel the combination with the rim, of a socket-plate secured to its inner face and formed with an inwardly-extending bulging portion and on its opposite side adjacent to the face of the rim with a concavity, a spoke extending through an opening in the bulging portion of the plate, a head on the end of the spoke situated in the concavity, and a shoulder on the spoke at the opposite side of the plate.

3. In a metal wheel the combination with the rim, of a socket-plate formed with an inwardly-extending rounded bulging portion and having on its opposite side a corresponding rounded depression, leaving a space between the plate and rim, the said plate beyond the concavity being flat at its ends, and sides, a spoke having its end extending through the bulging portion of the plate and wholly surrounded by the concavity, a head on the end of the spoke situated in the concavity, and a shoulder on the spoke at the opposite side of the plate.

4. In a metal wheel the combination with the rim of the socket-plate secured to its inner face and formed to leave a space between them, a spoke having its end extending through the said plate and firmly connected thereto, and a head on the end of the spoke situated in the space and maintained out of contact with the rim.

In testimony whereof I hereunto set my hand, this 13th day of April, 1900, in the presence of two attesting witnesses.

EMIL EINFELDT.

Witnesses:
NATH FRENCH,
WALTER CHAMBERS.